United States Patent
Orita et al.

(10) Patent No.: US 10,677,152 B2
(45) Date of Patent: Jun. 9, 2020

(54) HYDRAULIC SERVO DEVICE AND TURBOCHARGER

(71) Applicant: Komatsu Ltd., Tokyo (JP)

(72) Inventors: Tetsuo Orita, Oyama (JP); Yuuki Muranaka, Oyama (JP); Shigemori Suzuki, Oyama (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/304,537

(22) PCT Filed: Jul. 14, 2016

(86) PCT No.: PCT/JP2016/070879
§ 371 (c)(1),
(2) Date: Oct. 17, 2016

(87) PCT Pub. No.: WO2017/038273
PCT Pub. Date: Mar. 9, 2017

(65) Prior Publication Data
US 2018/0016969 A1    Jan. 18, 2018

(51) Int. Cl.
*F02B 37/22* (2006.01)
*F02B 77/11* (2006.01)
(Continued)

(52) U.S. Cl.
CPC .............. *F02B 37/22* (2013.01); *F02B 37/24* (2013.01); *F02B 39/005* (2013.01); *F02B 39/16* (2013.01);
(Continued)

(58) Field of Classification Search
CPC .......... F02B 37/18; F02B 37/02; F02B 37/22; F02B 37/24; F02B 39/005; F02B 39/16;
(Continued)

(56) References Cited

U.S. PATENT DOCUMENTS

| | | | |
|---|---|---|---|
| 6,435,169 B1 * | 8/2002 | Vogt | F02D 21/08 123/568.23 |
| 8,109,089 B2 * | 2/2012 | Gilch | F01D 17/10 251/129.12 |

(Continued)

FOREIGN PATENT DOCUMENTS

| | | | | |
|---|---|---|---|---|
| CN | 201581938 U | 9/2010 | | |
| DE | 102014106517 A1 * | 11/2015 | ............ | F02B 37/186 |

(Continued)

OTHER PUBLICATIONS

International Search Report and Written Opinion dated Sep. 27, 2016, issued for PCT/JP2016/070879.
(Continued)

*Primary Examiner* — Matthew T Largi
(74) *Attorney, Agent, or Firm* — Locke Lord LLP (57) ABSTRACT

A hydraulic servo device includes: a servo piston configured to move in an axial direction with respect to a device main body; and a stroke sensor configured to detect an amount of movement of the servo piston with respect to the device main body. The hydraulic servo device is configured to change a supply flow rate of exhaust gas to a turbine of a turbocharger by moving the servo piston according to applied hydraulic pressure. A cooling water channel through which cooling water is to be supplied is provided at a part between the turbocharger and the stroke sensor.

12 Claims, 7 Drawing Sheets

(51) Int. Cl.
*G01D 5/14* (2006.01)
*F02B 39/00* (2006.01)
*F02B 37/24* (2006.01)
*F02B 39/16* (2006.01)

(52) U.S. Cl.
CPC .............. *F02B 77/11* (2013.01); *G01D 5/145* (2013.01); *Y02T 10/144* (2013.01)

(58) Field of Classification Search
CPC .......... F02B 77/11; F01D 17/02; F01D 17/14; F01D 25/08; F01D 25/12; G01D 5/145
See application file for complete search history.

(56) References Cited

U.S. PATENT DOCUMENTS

| | | |
|---|---|---|
| 2005/0247058 A1 | 11/2005 | Pedersen et al. |
| 2008/0083397 A1* | 4/2008 | Ueno .................... F01D 25/164 123/559.1 |
| 2010/0043429 A1* | 2/2010 | Wolk ...................... F02B 37/18 60/602 |
| 2011/0011077 A1* | 1/2011 | Kozuka ................. F01D 17/143 60/445 |
| 2013/0098033 A1* | 4/2013 | Murakami .............. F02B 37/18 60/602 |
| 2013/0340426 A1* | 12/2013 | Bogner ................. F01D 17/105 60/602 |
| 2014/0090375 A1* | 4/2014 | Kanzaka ............... F01D 25/125 60/605.3 |
| 2014/0130506 A1* | 5/2014 | Gale ........................ F02C 6/12 60/773 |
| 2017/0082017 A1* | 3/2017 | Nowak ................. F02B 37/186 |

FOREIGN PATENT DOCUMENTS

| | | | |
|---|---|---|---|
| JP | WO 2007060831 A1 * | 5/2007 | ............. F02B 37/18 |
| JP | 2007-146687 A | 6/2007 | |
| JP | 2010-059844 A | 3/2010 | |
| JP | 2015-040542 A | 3/2015 | |
| JP | 2015040542 A * | 3/2015 | |
| WO | 2007/060831 A1 | 5/2007 | |
| WO | 2010/009945 A2 | 1/2010 | |

OTHER PUBLICATIONS

Office Action dated Nov. 22, 2017 issued for corresponding German Patent Application No. 11 2016 000 069.3.

* cited by examiner

HYDRAULIC SERVO DEVICE AND TURBOCHARGER

FIELD

The present invention relates to a hydraulic servo device and a turbocharger.

BACKGROUND

Some turbochargers are provided with a hydraulic servo device. The hydraulic servo device includes a servo piston that is movably disposed to a device main body, and a stroke sensor for detecting the amount of movement of the servo piston with respect to the device main body, and functions to change the area of an exhaust passage of the turbocharger by the movement of the servo piston. The stroke sensor includes a moving element that is provided to the servo piston, and a stator that is provided to the device main body, and detects the amount of movement of the servo piston with respect to the device main body by detecting movement of the moving element by the stator. According to a turbocharger provided with this type of hydraulic servo device, the supply flow rate of exhaust gas to a turbine is changed by changing the area of the exhaust passage. Accordingly, for example, in a low revolution area of an engine, the supply flow rate of exhaust gas to the turbine may be increased by reducing the area of the passage, and the rotation energy of the turbine is increased, and the charging performance of a compressor may be increased (for example, see Patent Literature 1).

CITATION LIST

Patent Literature

Patent Literature 1: Japanese Patent Application Laid-open No. 2010-59844

SUMMARY

Technical Problem

To constantly achieve optimal charging performance at the turbocharger provided with the hydraulic servo device as described above, accurate control of the position of the servo piston becomes a key issue. However, the turbocharger through which exhaust gas passes is continuously maintained at a high temperature during operation of the engine, and thus, the temperature of the stroke sensor also becomes high, thereby possibly affecting the output result.

Therefore, according to the disclosure of Patent Literature 1, the problem described above is solved by causing oil to circulate in a chamber, of the device main body, where the moving element is accommodated. However, a turbocharger that is applied to an engine with a large displacement generates a great amount of heat. Accordingly, a hydraulic servo device that can reduce the influence of heat on the stroke sensor even when provided to a turbocharger that is applied to an engine with a large displacement is desired.

In view of the above circumstances, the present invention has its object to provide a hydraulic servo device that can reduce the influence of heat on a stroke sensor, and a turbocharger.

Solution to Problem

To achieve the object, a hydraulic servo device according to the present invention includes: a servo piston configured to move in an axial direction with respect to a device main body; and a stroke sensor configured to detect an amount of movement of the servo piston with respect to the device main body, the hydraulic servo device is configured to change a supply flow rate of exhaust gas to a turbine of a turbocharger by moving the servo piston according to applied hydraulic pressure, and a cooling water channel through which cooling water is to be supplied is provided at a part between the turbocharger and the stroke sensor.

Moreover, the above-described hydraulic servo device according to the present invention includes a heat shield portion at a part surrounding the stroke sensor, and the heat shield portion includes the cooling water channel.

Moreover, in the above-described hydraulic servo device according to the present invention, the cooling water channel includes a plate-shaped space that is provided inside a thick portion of the heat shield portion.

Moreover, in the above-described hydraulic servo device according to the present invention, the stroke sensor includes: a moving element that is provided at one end portion of the servo piston; and a stator that is disposed to the device main body, at a part around the moving element, and that is configured to detect a change in a position of the moving element with respect to the device main body, and the device main body is provided with the cooling water channel at a sensor holding portion that holds the stator, at a connection part to the turbocharger.

Moreover, in the above-described hydraulic servo device according to the present invention, the stroke sensor includes: a moving element that is provided at one end portion of the servo piston; and a stator that is disposed to the device main body, at a part around the moving element, and that is configured to detect a change in a position of the moving element with respect to the device main body, and the device main body is provided with the cooling water channel at a sensor holding portion that holds the stator, at a connection part to the turbocharger, and a heat shield portion including the cooling water channel inside a thick portion, the heat shield portion being provided in a manner covering a surrounding of the stroke sensor, where the cooling water channel of the device main body and the cooling water channel of the heat shield portion are connected with each other.

Moreover, in the above-described hydraulic servo device according to the present invention, the stroke sensor includes: a moving element that is provided at one end portion of the servo piston; and a stator that is disposed to the device main body, at a part around the moving element, and that is configured to detect a change in a position of the moving element with respect to the device main body, and the heat shield portion covers a part surrounding the stator and a part at an extension of an axis of the servo piston, and includes the cooling water channel at at least the part surrounding the stator.

Moreover, a turbocharger according to the present invention includes: a center housing between a compressor housing accommodating a compressor and the turbine housing, a shaft to which the compressor and the turbine are attached is rotatably supported at the center housing by a bearing, and a housing cooling water channel whose part surrounding the bearing is to be supplied with cooling water is provided, and the hydraulic servo device is attached to the center housing in a state where the cooling water channel is connected to the housing cooling water channel.

Advantageous Effects of Invention

According to the present invention, a cooling water channel to which cooling water is to be supplied is provided around a stroke sensor, at a part between the stroke sensor and a turbocharger, and thus, the entire stroke sensor is cooled, and even in the case of application to an engine with a great displacement, the influence of heat may be reduced.

DESCRIPTION OF EMBODIMENTS

Hereinafter, a preferred embodiment of a hydraulic servo device according to the present invention will be described in detail with reference to FIGS. 1 to 7 appended. Arrows X, Y and Z in the drawings indicate the same directions. In the following, for the sake of convenience, description may be given taking the arrow X as the front in the front-back direction (opposite is the rear), the arrow Y as the left in the left-right direction (opposite is the right), and the arrow Z as the top in the top-down direction (the opposite is the down).

Figure 1:
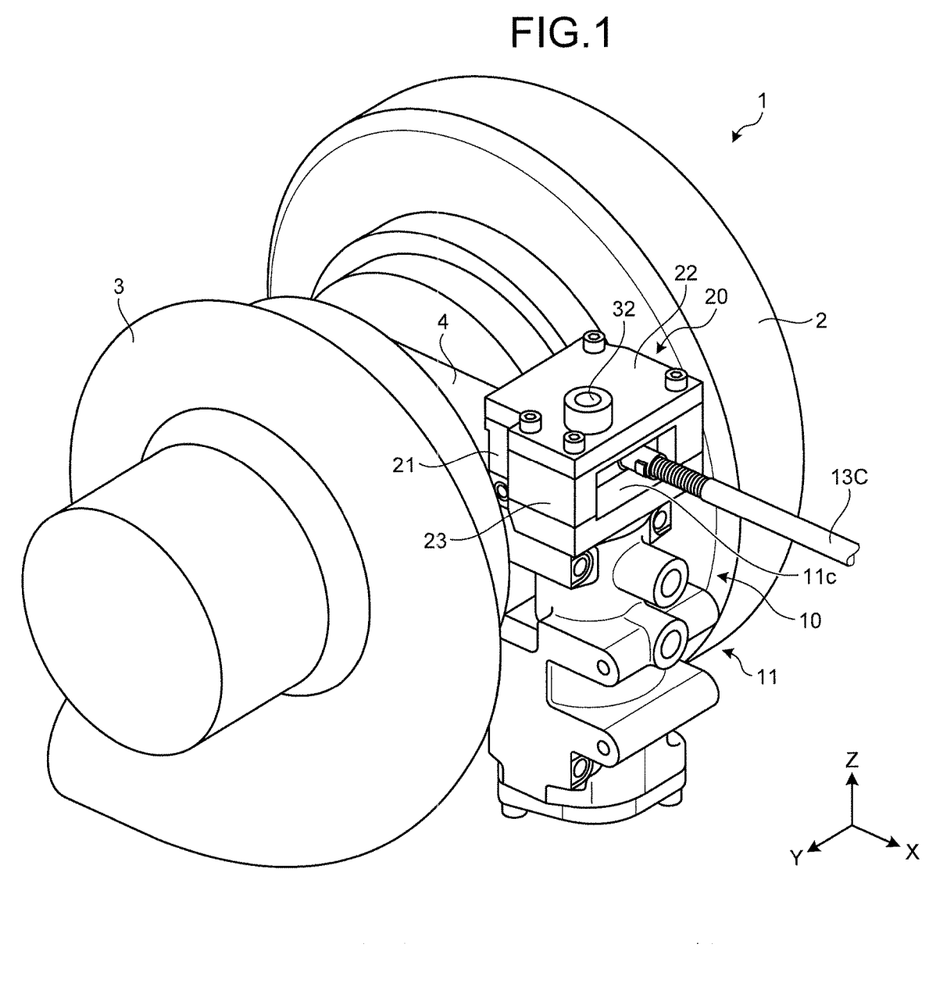
FIG. 1 is a perspective view illustrating an external appearance of a turbocharger to which a hydraulic servo device which is an embodiment of the present invention is applied.
Figure 2:
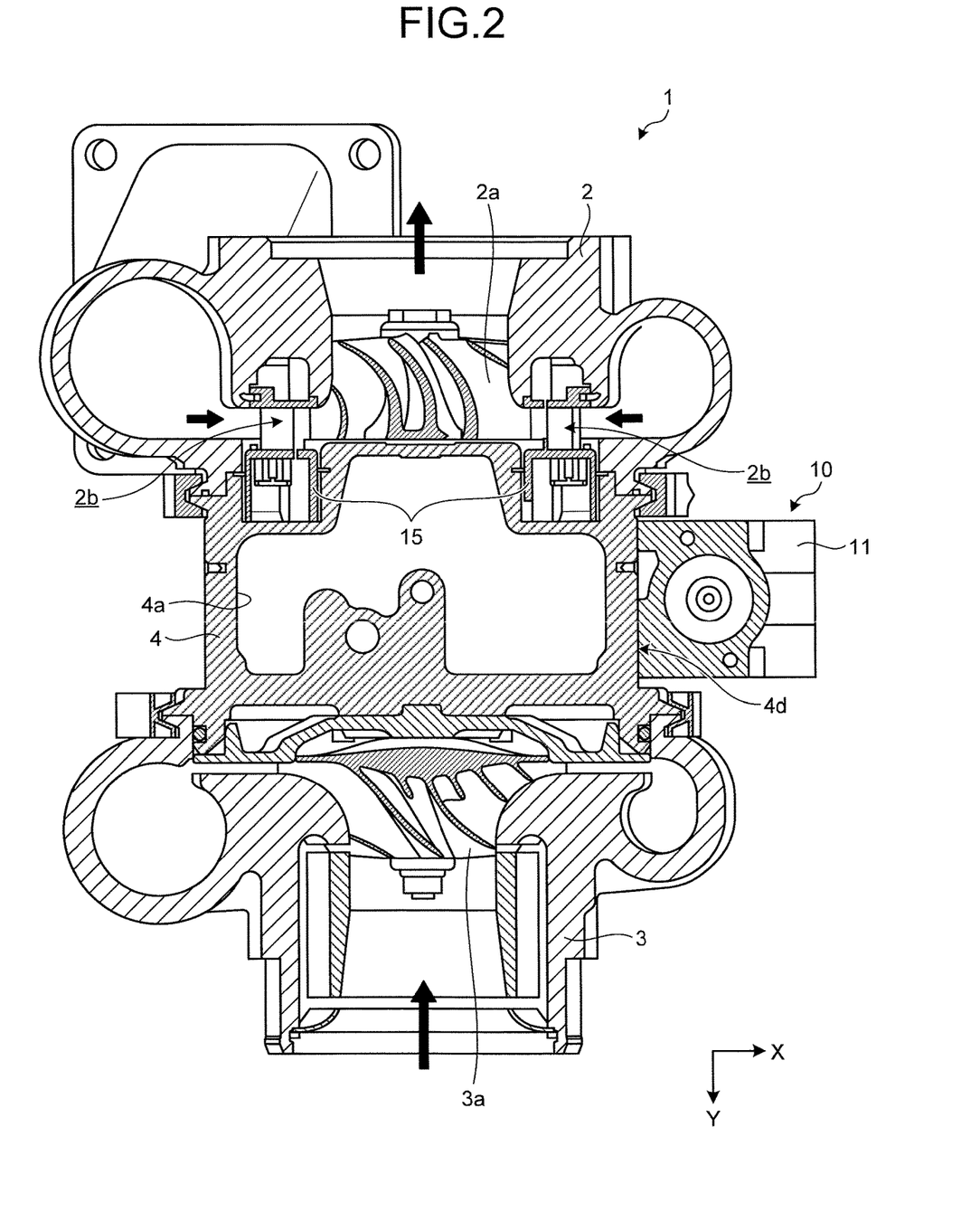
FIG. 2 is a cross-sectional plan view of the turbocharger and the hydraulic servo device illustrated in FIG. 1.
Figure 3:
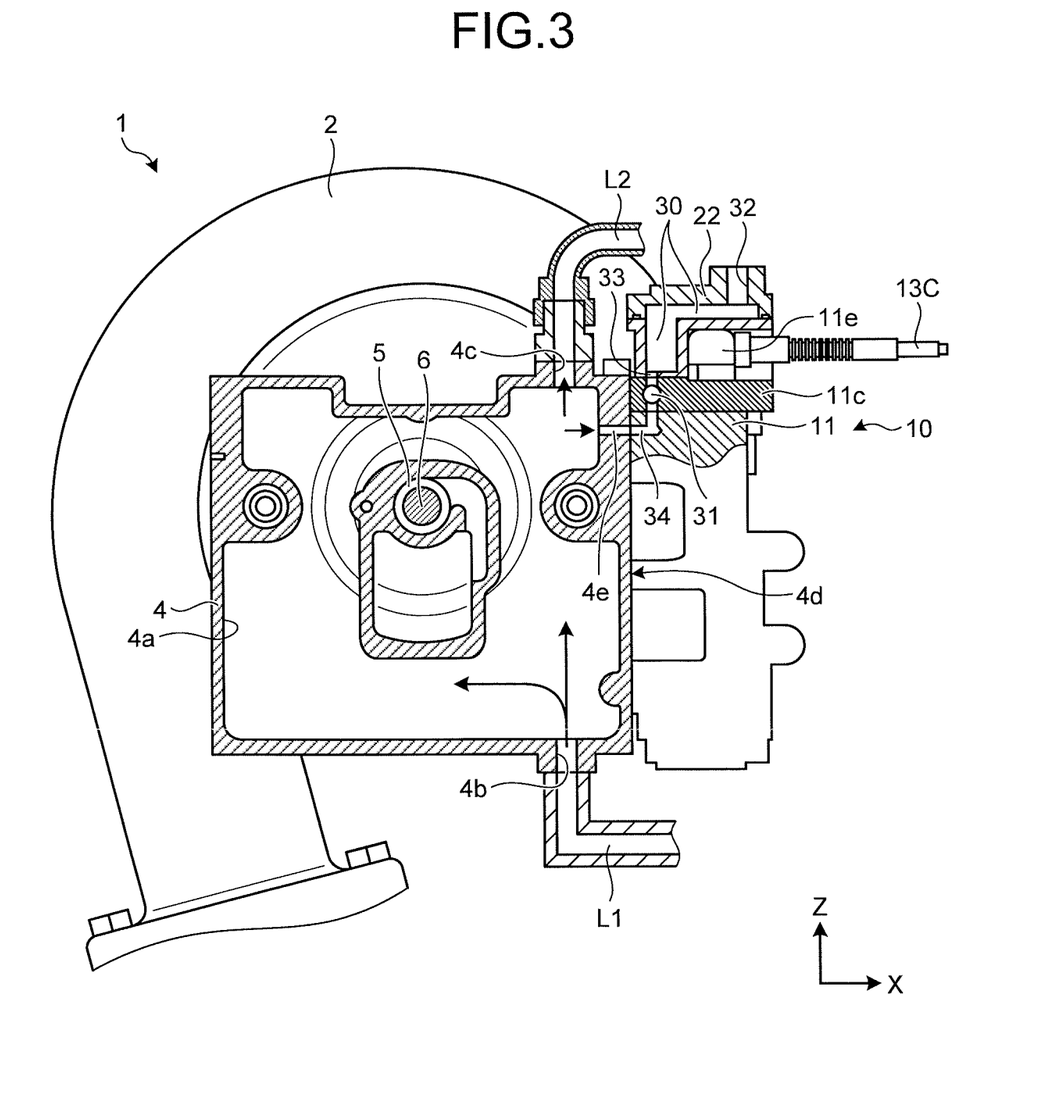
FIG. 3 is a cross-sectional side view of the turbocharger illustrated in FIG. 1.

FIGS. 1 and 2 illustrate a turbocharger to which a hydraulic servo device which is an embodiment of the present invention is applied. A turbocharger 1 illustrated here is assumed to be mounted on an engine with a large displacement (for example, a diesel engine with a displacement of at least 23,000 cc), and includes a center housing 4 between a turbine housing 2 that accommodates a turbine 2a and a compressor housing 3 that accommodates a compressor 3a. As illustrated in FIG. 3, the center housing 4 rotatably supports a shaft 6 by a bearing 5. Although not illustrated, the shaft 6 has the turbine 2a attached to one end portion and the compressor 3a attached to the other end portion. A housing cooling water channel 4a is provided at a part, of the center housing 4, around the bearing 5. The housing cooling water channel 4a is a watertight space having a water intake port 4b at a lower end portion, and a water discharge port 4c at an upper end portion. The housing cooling water channel 4a has a water supply pipe L1 connected to the water intake port 4b, and a water discharge pipe L2 connected to the water discharge port 4c. The water supply pipe L1 connects to a discharge port of a water pump that is driven by an engine not illustrated, and the water discharge pipe L2 connects to an inlet of a radiator (not illustrated). That is, when the water pump is driven by the engine, cooling water is supplied and circulated through the housing cooling water channel 4a of the center housing 4. With the turbocharger 1 according to which cooling water is supplied and circulated through the housing cooling water channel 4a of the center housing 4, lubricating oil is not exposed to high temperature, and the bearing 5 and the shaft 6 are constantly lubricated by the lubricating oil, and thus, seizure and abnormal wear do not occur between the bearing 5 and the shaft 6.

Figure 4:
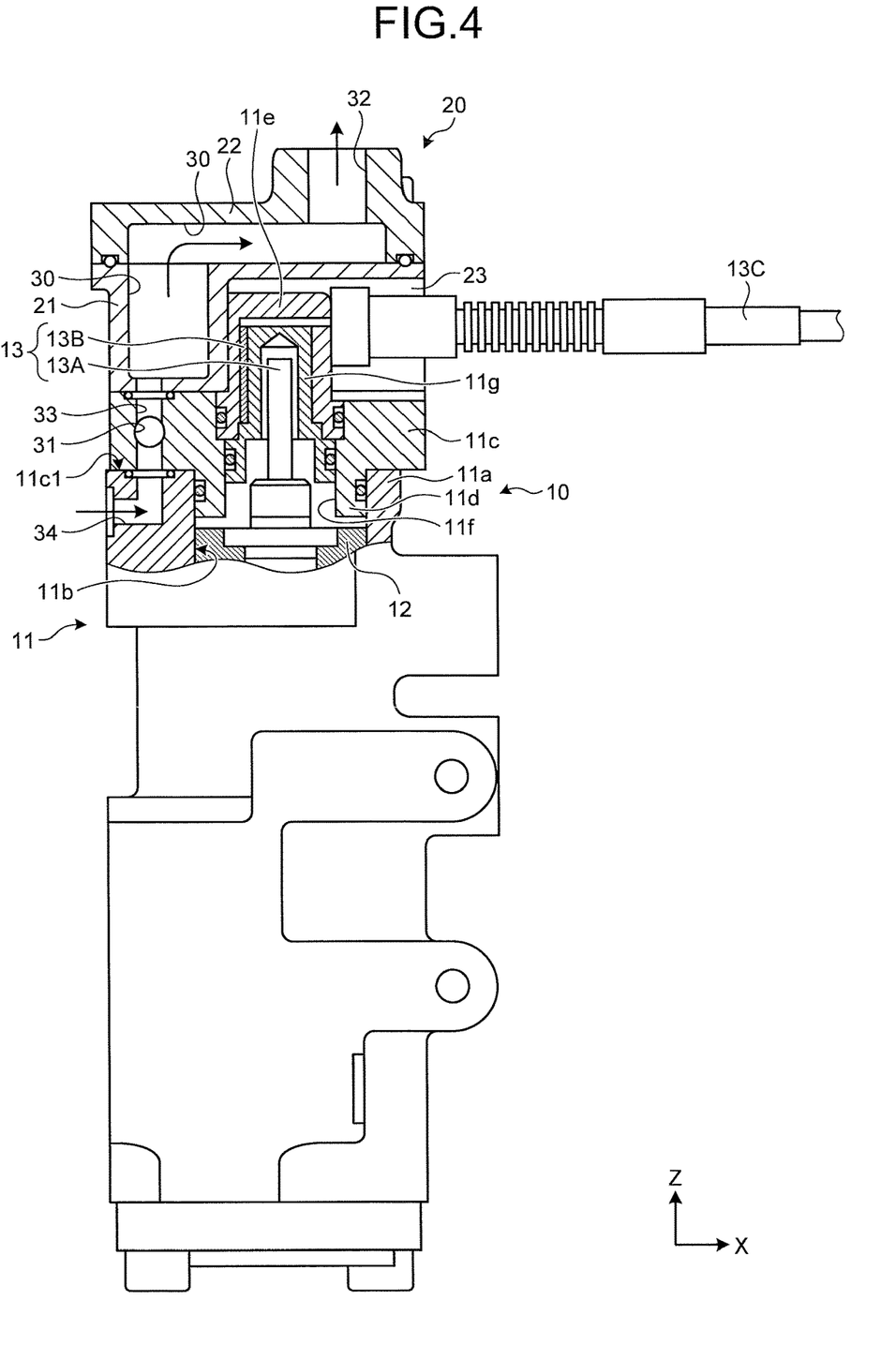
FIG. 4 is a cut-away view, seen from left, of main portions of the hydraulic servo device applied to the turbocharger illustrated in FIG. 1.

Furthermore, as illustrated in FIG. 2, a hydraulic servo device 10 is attached to a front surface 4d of the center housing 4. As illustrated in FIG. 4, the hydraulic servo device 10 is provided with a servo piston 12 and a stroke sensor 13 at a device main body 11. The servo piston 12 is movably disposed in a cylinder bore 11b provided at a base portion 11a of the device main body 11. Although not illustrated, a movable member 15 (see FIG. 2) of the turbocharger 1 is linked to the servo piston 12 by a link mechanism. The movable member 15 operates according to the amount of movement of the servo piston 12, and changes the opening area of an exhaust passage 2b that is provided to the turbine housing 2. As is clear from FIG. 4, a sensor holding portion 11c having a substantially rectangular outer shape is provided to the device main body 11, at an upper end portion of the cylinder bore 11b of the base portion 11a. The sensor holding portion 11c includes a stopper portion 11d to be fitted with the cylinder bore 11b. The servo piston 12 reaches a stroke end when abutting against the stopper portion 11d of the sensor holding portion 11c.

The stroke sensor 13 is for detecting the amount of movement of the servo piston 12 with respect to the device main body 11. In the present embodiment, the stroke sensor 13 is formed by attaching a moving element 13A at an upper end portion of the servo piston 12, and disposing a stator 13B at the device main body 11, at a position including the movement range of the moving element 13A. The moving element 13A is formed as a permanent magnet rod, and is disposed at an extension of an axis of the servo piston 12 with respective axes coinciding with each other. The stator 13B includes a magnetic field detection member, such as a hall IC, and is disposed between an outer cylindrical portion 11e and an inner cylindrical portion 11g that are provided in a manner surrounding the moving element 13A. The stator 13B detects the magnetic field at the time of the moving element 13A moving in the top-down direction according to the operation of the servo piston 12, and outputs a detection signal through a signal cable 13C extending outside the outer cylindrical portion 11e. The outer cylindrical portion 11e and the inner cylindrical portion 11g where the stator 13B is disposed each have a shape of a bottomed circular cylinder, and are attached to the sensor holding portion 11c by having an outer circumferential surface at an open end fitted in a fitting hole 11f provided to the sensor holding portion 11c. The inner cylindrical portion 11g is fitted inside the outer cylindrical portion 11e, and shuts off the stator 13B from oil that is supplied to around the moving element 13A.

As illustrated in FIGS. 4 to 7, a heat shield portion 20 is provided to the device main body 11, at a part around the stroke sensor 13. In the present embodiment, the heat shield portion 20 including a rear wall portion 21, a top wall portion 22, and two side wall portions 23 is provided. The rear wall portion 21 is a cuboid part extending upward along the axis of the servo piston 12 from a rear edge part which is adjacent to the front surface 4d (see FIG. 2) of the center housing 4 at an upper surface 11c1 of the sensor holding portion 11c. The top wall portion 22 is a cuboid part protruding forward from an upper end portion of the rear wall portion 21. The top wall portion 22 is a cuboid part extending in a manner covering the entire upper surface of the sensor holding portion 11c, including the outer cylindrical portion 11e. The two side wall portions 23 are provided from left and right edge parts of the upper surface 11c1 of the sensor holding portion 11c, so as to block an opening between the sensor holding portion 11c and the top wall portion 22.

Figure 5:
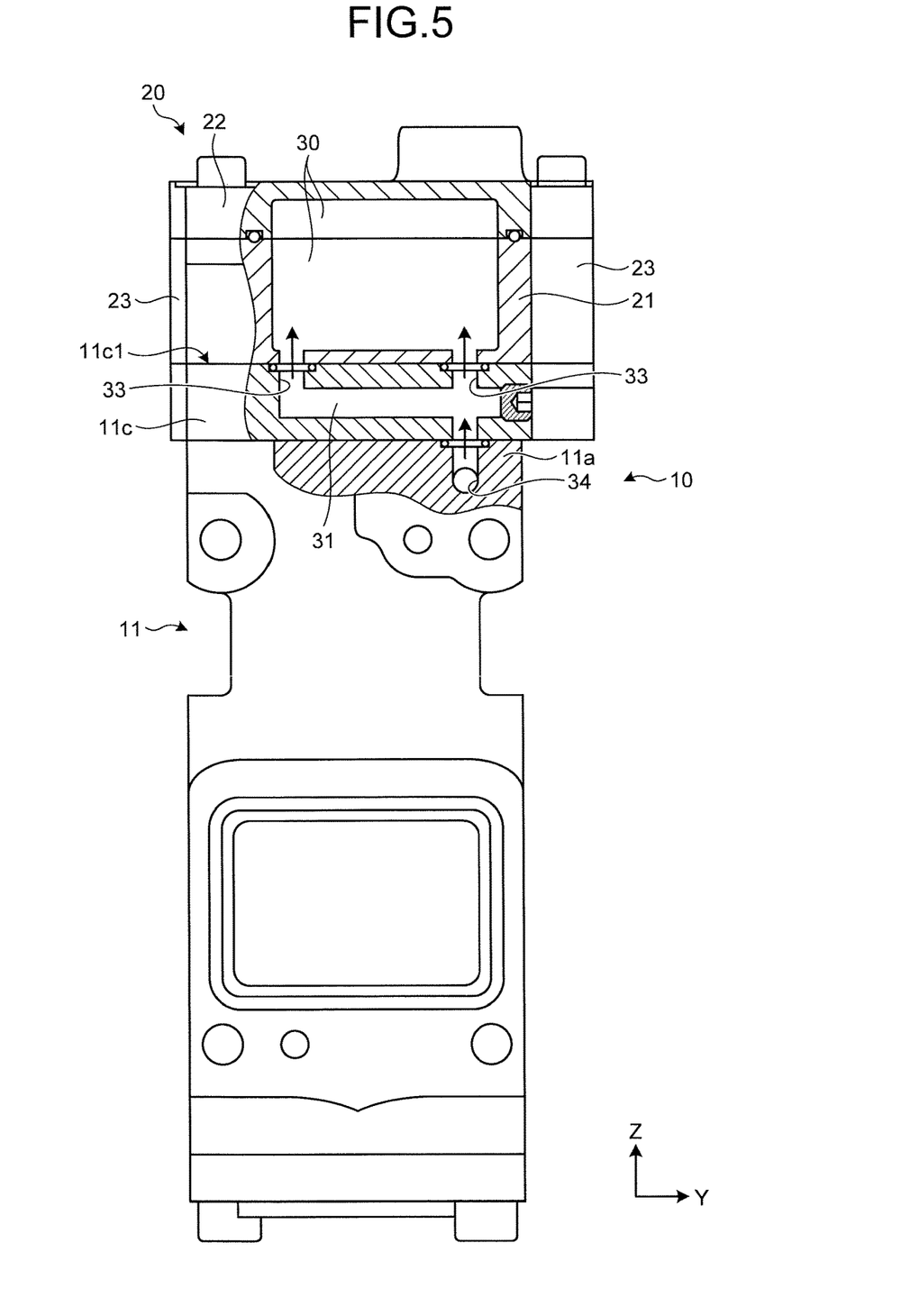
FIG. 5 is a cut-away view, seen from a rear side, of main portions of the hydraulic servo device illustrated in FIG. 4.
Figure 6:
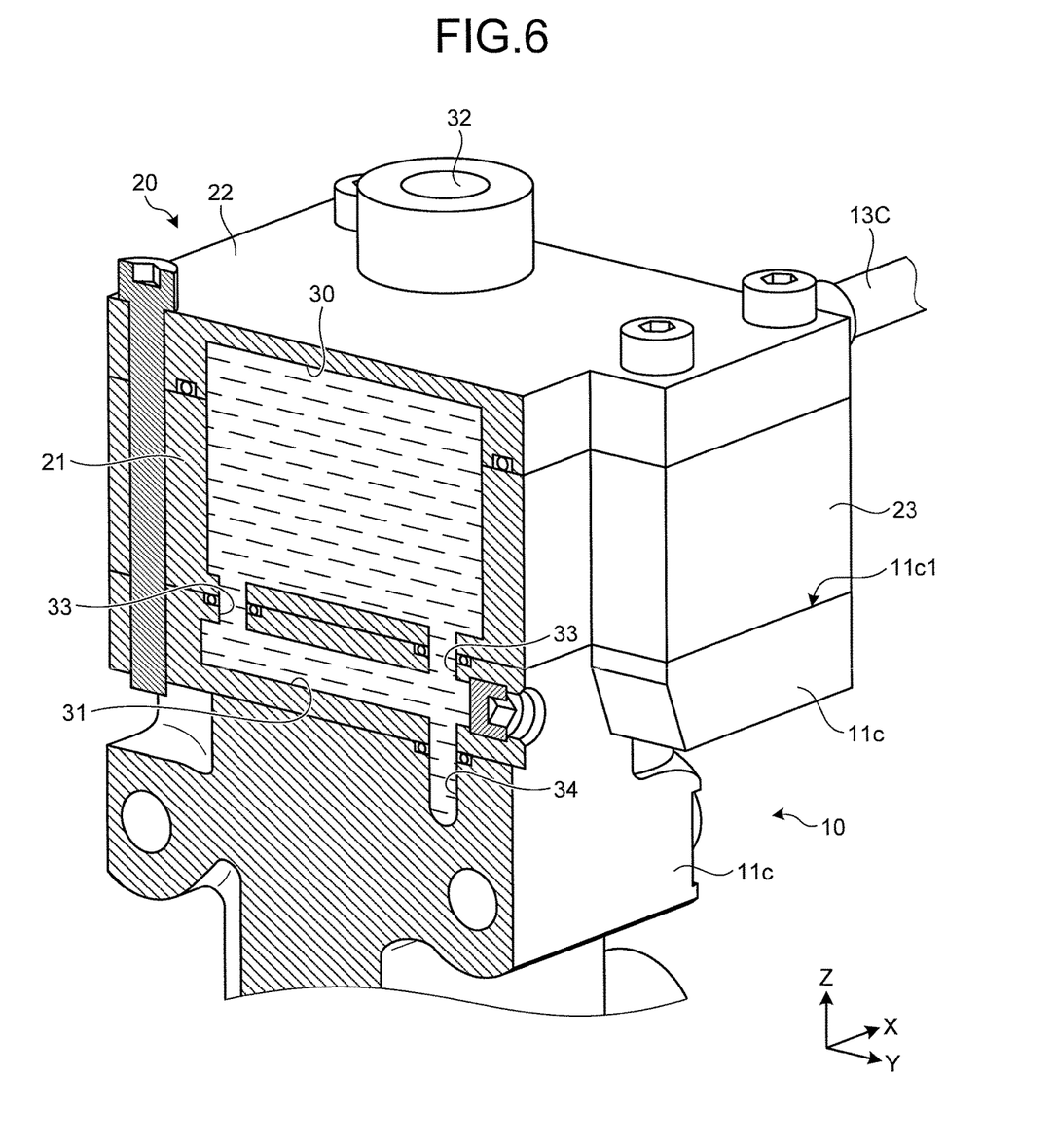
FIG. 6 is a rear cross-sectional perspective view of a heat shield portion of the hydraulic servo device illustrated in FIG. 3, seen from a rear wall side.
Figure 7:
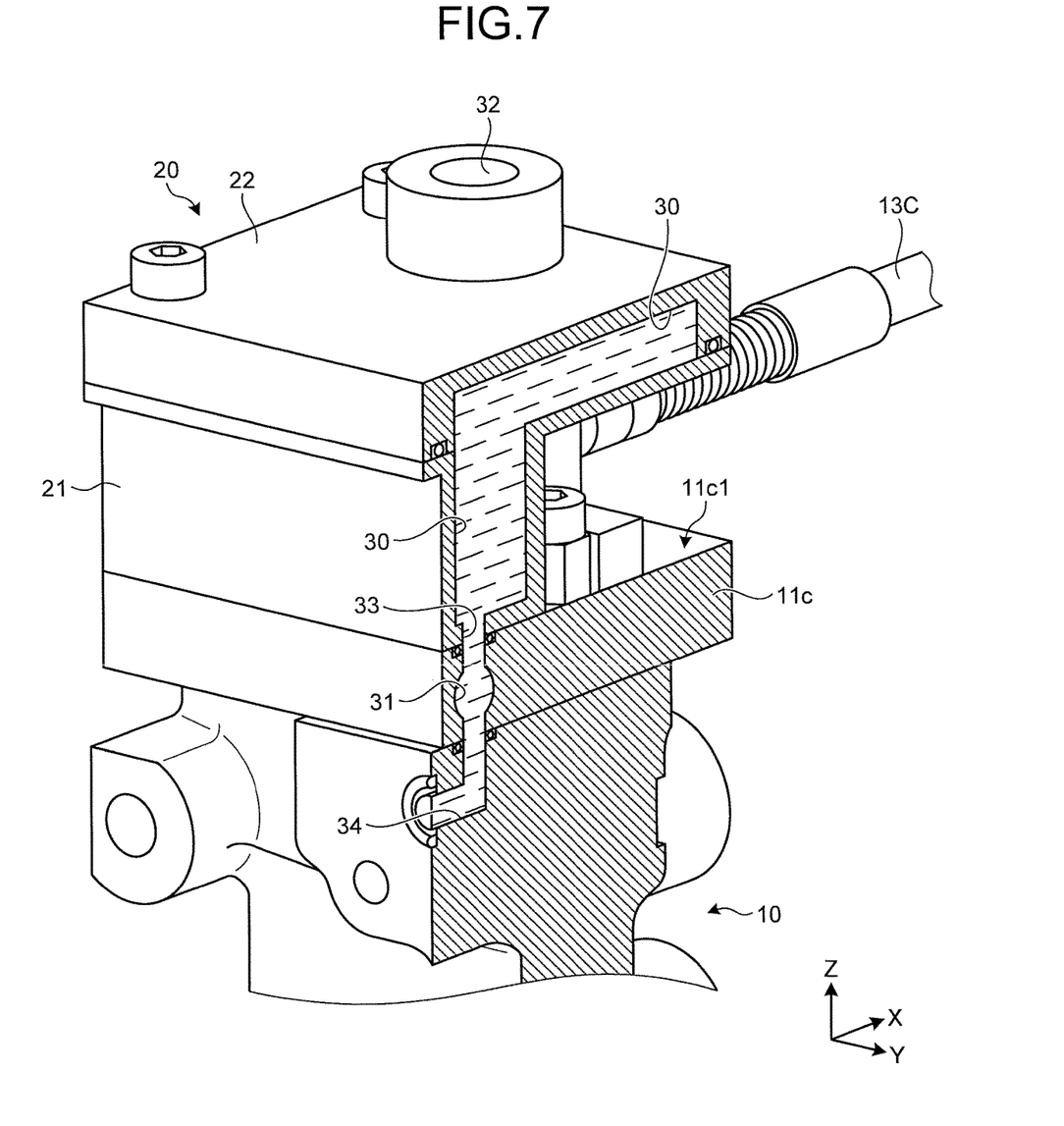
FIG. 7 is a side cross-sectional perspective view of the heat shield portion of the hydraulic servo device illustrated in FIG. 3, seen from the rear wall side.

As illustrated in FIG. 5, cooling water channels 30 and 31 are provided, respectively, to the heat shield portion 20 and the sensor holding portion 11c described above. As illustrated in FIG. 4, the cooling water channels 30 of the heat shield portion 20 are spaces provided inside thick portions of the rear wall portion 21 and the top wall portion 22, and are plate-shaped and are linked to each other inside the thick portions. The cooling water channel 30 of the top wall portion 22 is open to the outside through a water discharge channel 32 opened at an upper surface. A suction port of the water pump is connected to the water discharge channel 32 through a water discharge passage not illustrated. The cooling water channel 31 of the sensor holding portion 11c is a circular columnar space, and extends along a flat plane orthogonal to the axis of the moving element 13A, at a part between the center housing 4 and the moving element 13A. As illustrated in FIG. 5, both end portions of the cooling water channel 31 of the sensor holding portion 11c communicate with the cooling water channel 30 of the rear wall portion 21 through connecting water channels 33, and moreover, as illustrated in FIG. 2, the cooling water channel 31 is connected to the housing cooling water channel 4a through a connecting water channel 34 provided to the base portion 11a of the device main body 11 and a connecting water channel 4e of the center housing 4.

According to the turbocharger 1 configured in the above manner, when the engine is operated, cooling water supplied to the housing cooling water channel 4a of the center housing 4 is supplied to the cooling water channel 31 of the sensor holding portion 11c through the connecting water channel 34, and is further supplied to the cooling water channels 30 of the heat shield portion 20 through the connecting water channels 33. Accordingly, even in the case of application to an engine with a large displacement, transfer of heat from the center housing 4 of the turbocharger 1 to the stator 13B of the stroke sensor 13 is suppressed by the action of cooling water passing through the cooling water channel 31 of the sensor holding portion 11c. Also, radiation of heat from the turbocharger 1 to the stator 13B of the stroke sensor 13 is suppressed by the action of the heat shield portion 20 where cooling water is supplied to the cooling water channel 30 on the inside. As a result, because the influence of heat is reduced, the stroke sensor 13 is enabled to accurately detect and output the amount of movement of the servo piston 12. That is, according to the turbocharger 1 described above, the area of opening of the exhaust passage may be accurately controlled based on the amount of movement of the servo piston 12 output from the stroke sensor 13, and optimal charging performance may be constantly achieved.

Additionally, in the embodiment described above, the cooling water channels 30 provided to the heat shield portion 20 and the cooling water channel 31 provided to the sensor holding portion 11c are serially connected, and cooling water passing through the cooling water channel 31 of the sensor holding portion 11c is supplied to the cooling water channels 30 of the heat shield portion 20, but the present invention is not limited to such a case. For example, the cooling water channel 30 may be provided only to the heat shield portion 20, or cooling water may be separately supplied to the cooling water channels 30 of the heat shield portion 20 and the cooling water channel 31 of the sensor holding portion 11c.

Also, in the embodiment described above, the cooling water channels 30 of the heat shield portion 20 are connected to the housing cooling water channel 4a, and cooling water passing through the housing cooling water channel 4a is supplied to the cooling water channels 30 of the heat shield portion 20, but the cooling water channels 30 of the heat shield portion 20 do not necessarily have to be connected to the housing cooling water channel 4a. Additionally, in the case where the cooling water channels 30 of the heat shield portion 20 are connected to the housing cooling water channel 4a, it is also possible to supply, to the housing cooling water channel 4a, cooling water which has passed through the cooling water channels 30 of the heat shield portion 20.

Furthermore, in the embodiment described above, the cooling water channels 30 are provided to the rear wall portion 21 and the top wall portion 22 of the heat shield portion 20, but the cooling water channel 30 may alternatively be provided only to the rear wall portion 21 of the heat shield portion 20. Moreover, if a cooling water channel is provided also to the side wall portion 23 of the heat shield portion 20, it is possible to reduce the influence of heat from the turbocharger 1.

REFERENCE SIGNS LIST

1 Turbocharger
2 Turbine Housing
2A Turbine
3 Compressor Housing
3A Compressor
4 Center Housing
4A Housing Cooling Water Channel
5 Bearing
6 Shaft
10 Hydraulic Servo Device
11 Device Main Body
11C Sensor Holding Portion
12 Servo Piston
13 Stroke Sensor
13A Moving Element
13B Stator
20 Heat Shield Portion
30 Cooling Water Channel
31 Cooling Water Channel

The invention claimed is:
1. A hydraulic servo device comprising:
a servo piston configured to move in an axial direction with respect to a device main body;
a stroke sensor configured to detect an amount of movement of the servo piston with respect to the device main body; and
a heat shield portion including a cooling water channel, the cooling water channel being located between a turbocharger and the stroke sensor and running along a periphery of a side and a top of the stroke sensor to cool the stroke sensor,
wherein the hydraulic servo device is configured to change a supply flow rate of exhaust gas to a turbine of the turbocharger by moving the servo piston according to applied hydraulic pressure, and
wherein cooling water is supplied through the cooling water channel,
wherein the stroke sensor includes:
a moving element that is provided at one end portion of the servo piston; and a stator that is disposed to the device main body, at a part around the moving element, and that is configured to detect a change in a position of the moving element with respect to the device main body, and wherein the device main body is provided with another cooling water channel in a sensor holding portion that holds the stator, at a connection part to the turbocharger.

2. The hydraulic servo device according to claim 1, wherein the cooling water channel includes a plate-shaped space that is provided inside a thick portion of the heat shield portion.

3. The hydraulic servo device according to claim 1, wherein the heat shield portion includes the cooling water channel inside a thick portion, and the another cooling water channel of the device main body and the cooling water channel of the heat shield portion are connected with each other.

4. The hydraulic servo device according to claim 1, wherein the heat shield portion covers a part surrounding the stator and a part at an extension of an axis of the servo piston, and includes the cooling water channel at at least the part surrounding the stator.

5. The hydraulic servo device according to claim 1, wherein the cooling water channel is configured with a L-shaped cross-sectional profile to run along the periphery of the side and the top of the stroke sensor to cool the stroke sensor.

6. The hydraulic servo device according to claim 1, wherein the cooling water channel of a top wall portion of the heat shield portion is open to an outside through a water discharge channel opened from an upper surface to an opposite lower surface of the top wall portion, wherein the top wall portion is adjacent the top of the stroke sensor.

7. The hydraulic servo device according to claim 1, wherein the another cooling water channel communicates with the cooling water channel across one or more connecting water channels.

8. A turbocharger comprising:
a center housing between a compressor housing accommodating a compressor and a turbine housing;
a shaft to which the compressor and a turbine are attached, and that is rotatably supported at the center housing by a bearing;
a housing cooling water channel surrounding the bearing is to be supplied with cooling water, and the housing cooling water channel is provided in the center housing; and
a hydraulic servo device that is attached to the center housing in a state where a cooling water channel is connected to the housing cooling water channel, the hydraulic servo device including:
a servo piston configured to move in an axial direction with respect to a device main body;
a stroke sensor configured to detect an amount of movement of the servo piston with respect to the device main body; and
a heat shield portion including the cooling water channel, the cooling water channel being located between the center housing and the stroke sensor and running along a periphery of a side and a top of the stroke sensor to cool the stroke sensor,
wherein the hydraulic servo device is configured to change a supply flow rate of exhaust gas to the turbine by moving the servo piston according to applied hydraulic pressure, and wherein cooling water is supplied through the cooling water channel,
wherein the stroke sensor includes:
a moving element that is provided at one end portion of the servo piston; and
a stator that is disposed to the device main body, at a part around the moving element, and that is configured to detect a change in a position of the moving element with respect to the device main body, and
wherein the device main body is provided with another cooling water channel at a sensor holding portion that holds the stator, at a connection part to the center housing.

9. The turbocharger according to claim 8, wherein the cooling water channel includes a plate-shaped space that is provided inside a thick portion of the heat shield portion.

10. The turbocharger according to claim 8, wherein the heat shield portion includes the cooling water channel inside a thick portion, and the another cooling water channel of the device main body and the cooling water channel of the heat shield portion are connected with each other.

11. The turbocharger according to claim 8, wherein the heat shield portion covers a part surrounding the stator and a part at an extension of an axis of the servo piston, and includes the cooling water channel at at least the part surrounding the stator.

12. A hydraulic servo device comprising:
a servo piston configured to move in an axial direction with respect to a device main body;
a stroke sensor configured to detect an amount of movement of the servo piston with respect to the device main body; and
a heat shield portion including a cooling water channel, the cooling water channel being located between a turbocharger and the stroke sensor and running along a periphery of a side and a top of the stroke sensor to cool the stroke sensor,
wherein the hydraulic servo device is configured to change a supply flow rate of exhaust gas to a turbine of the turbocharger by moving the servo piston according to applied hydraulic pressure, and
wherein cooling water is supplied through the cooling water channel, and
wherein the stroke sensor includes:
a moving element that is provided at one end portion of the servo piston; and
a stator that is disposed to the device main body, at a part around the moving element, and that is configured to detect a change in a position of the moving element with respect to the device main body,
the device main body is provided with another cooling water channel in a sensor holding portion that holds the stator, at a connection part to the turbocharger,
the heat shield portion includes the cooling water channel inside a thick portion, and the another cooling water channel of the device main body and the cooling water channel of the heat shield portion are connected with each other, and
wherein the cooling water channel of a top wall portion of the heat shield portion is open to an outside through a water discharge channel opened from an upper surface to an opposite lower surface of the top wall portion, wherein the top wall portion is adjacent the top of the stroke sensor.

* * * * *